US008962191B2

(12) United States Patent
Vallance et al.

(10) Patent No.: US 8,962,191 B2
(45) Date of Patent: Feb. 24, 2015

(54) ELECTROCHEMICAL CELLS HAVING A ELECTRODE CURRENT COLLECTOR EXTENDING INTO A POSITIVE ELECTRODE COMPOSITION, AND RELATED METHODS

(75) Inventors: Michael Alan Vallance, Loudonville, NY (US); Brandon Alan Bartling, Bethlehem, NY (US)

(73) Assignee: General Electric Company, Niskayuna, NY (US)

( * ) Notice: Subject to any disclaimer, the term of this patent is extended or adjusted under 35 U.S.C. 154(b) by 281 days.

(21) Appl. No.: 13/563,111

(22) Filed: Jul. 31, 2012

(65) Prior Publication Data
US 2014/0038038 A1 Feb. 6, 2014

(51) Int. Cl.
*H01M 10/04* (2006.01)
*H01M 4/64* (2006.01)
*H01M 4/38* (2006.01)
*H01M 4/44* (2006.01)
*H01M 4/58* (2010.01)

(52) U.S. Cl.
USPC ........ 429/233; 429/238; 429/211; 429/231.5; 429/223; 429/221; 429/225; 29/623.1

(58) Field of Classification Search
USPC .............. 429/211, 103, 113, 117, 221, 231.5, 429/223, 225, 233, 238; 29/623.1
See application file for complete search history.

(56) References Cited

U.S. PATENT DOCUMENTS

| 3,945,852 | A | * | 3/1976 | Dey ............................. 429/208 |
| 4,357,398 | A | * | 11/1982 | Nelson et al. ................... 429/94 |
| 4,440,837 | A | | 4/1984 | Shimotake et al. |
| 4,992,345 | A | | 2/1991 | Meintjes et al. |
| 5,573,871 | A | | 11/1996 | Von Benda |
| 6,358,393 | B1 | | 3/2002 | Berclaz et al. |
| 6,482,540 | B1 | * | 11/2002 | Gozdz et al. .................... 429/94 |
| 7,000,297 | B2 | | 2/2006 | Frustaci et al. |
| 8,110,301 | B2 | | 2/2012 | Iacovangelo et al. |
| 2005/0095508 | A1 | * | 5/2005 | Yamamoto .................... 429/339 |
| 2005/0255339 | A1 | | 11/2005 | Tsai et al. |
| 2007/0275293 | A1 | * | 11/2007 | Begg et al. ....................... 429/53 |

(Continued)

FOREIGN PATENT DOCUMENTS

WO 2011109815 A1 9/2011

OTHER PUBLICATIONS

J.L. Sudworth, "The Sodium/nickel chloride (ZEBRA) Battery", Journal of Power Sources, 2001, vol. 100, Issue 1-2, pp. 149-163.

(Continued)

*Primary Examiner* — Kenneth Douyette
(74) *Attorney, Agent, or Firm* — Francis T. Coppa

(57) ABSTRACT

An electrochemical cell is presented. The electrochemical cell includes an elongated ion-conducting separator defining at least a portion of a first compartment; a positive electrode composition disposed in the first compartment, the positive electrode composition comprising at least one electroactive metal, at least one alkali metal halide, and at least one electrolyte. A positive current collector is further disposed in the first compartment such that a portion of the positive current collector extends into the positive electrode composition, and a primary dimension of the extended portion of the positive current collector is less than about 20% of a primary dimension of the first compartment. A related method for the preparation of an electrochemical cell is also presented.

20 Claims, 7 Drawing Sheets

(56) References Cited

U.S. PATENT DOCUMENTS

| | | |
|---|---|---|
| 2010/0108537 A1 | 5/2010 | Perego et al. |
| 2011/0070496 A1* | 3/2011 | Soloveichik et al. ......... 429/221 |
| 2011/0163274 A1 | 7/2011 | Plee et al. |
| 2011/0168550 A1 | 7/2011 | Wang et al. |
| 2011/0256433 A1 | 10/2011 | Fuhr et al. |

OTHER PUBLICATIONS

Song, "Nanocrystalline Nickel Hydroxide in Pasted Nickel Electrodes for Rechargeable Nickel Batteries", International Conference on Nanoscience and Nanotechnology, Jul. 3-7, 2006, 3 pages.

\* cited by examiner

US 8,962,191 B2

ELECTROCHEMICAL CELLS HAVING A ELECTRODE CURRENT COLLECTOR EXTENDING INTO A POSITIVE ELECTRODE COMPOSITION, AND RELATED METHODS

BACKGROUND OF THE INVENTION

This invention relates generally to electrochemical cells. In some specific embodiments, the invention relates to high-temperature, rechargeable electrochemical cells, and related devices.

Metal halide electrochemical cells (for example, sodium-metal chloride batteries) including a molten metal negative electrode (usually referred to as the anode) and a beta-alumina solid electrolyte, are of considerable interest for energy storage applications. In addition to the anode, the cells include a positive electrode (usually referred to as the cathode) that supplies/receives electrons during the charge/discharge of the cells. In some designs, the cathode volume is cylindrical, with the axis of the cylinder in the longitudinal direction. The cathode composition typically includes a porous interspersed mixture of electroactive metal and alkali metal halide powders, impregnated with molten electrolyte. The electrochemical cell further includes a positive current collector (usually referred to as the cathode current collector). The cathode current collector typically includes a solid or composite nickel rod/wire that extends into the cathode composition. In these electrochemical cell configurations, the electronic cathode current is conducted radially through the porous metal network and axially through the cathode current collector.

Metal halide electrochemical cells (for example, sodium-metal chloride batteries) including a molten metal negative electrode (usually referred to as the anode) and a beta-alumina solid electrolyte, are of considerable interest for energy storage applications. In addition to the anode, the cell include a positive electrode (usually referred to as the cathode) that supplies/receives electrons during the charge/discharge of the cells. The cathode typically includes a porous metal network interspersed with the cathode composition and impregnated with molten electrolyte. The electrochemical cell further includes a positive current collector (usually referred to as the cathode current collector). The cathode current collector typically includes a solid/plated nickel rod/wire that extends into the cathode composition. In these electrochemical cell configurations, the electrical current is conducted radially through the porous metal network and axially through the cathode current collector.

However, the electrochemical cell configurations with the conventional cathode current collector designs may be cost-prohibitive in some end-use applications. Further, the electrochemical cells (such, as sodium metal halide batteries) may, under some conditions, degrade very rapidly, and the charging time may increase significantly. Thus, there is a need for cost-effective electrochemical cells having the desired performance attributes for a variety of different applications.

BRIEF DESCRIPTION OF THE INVENTION

One embodiment of the invention is directed to an electrochemical cell. The electrochemical cell comprises:
  (a) an elongated ion-conducting separator having a first surface that defines at least a portion of a first compartment and a second surface that defines at least a portion of a second compartment;
  (b) a positive electrode composition disposed in the first compartment, the positive electrode composition comprising at least one electroactive metal, at least one alkali metal halide, and at least one electrolyte; and
  (c) a positive current collector disposed in the first compartment such that a portion of the positive current collector extends into the positive electrode composition,
  wherein the first compartment is characterized by a primary dimension and the extended portion of the positive current collector is characterized by a primary dimension, and the primary dimension of the extended portion of the positive current collector is less than about 20% of the primary dimension of the first compartment.

Another embodiment of the invention is directed to an electrochemical cell, comprising:
  (a) an elongated ion-conducting separator having a first surface that defines at least a portion of a first compartment and a second surface that defines at least a portion of a second compartment;
  (b) a positive electrode composition disposed in the first compartment, the positive electrode composition comprising at least one electroactive metal, at least one alkali metal halide, and at least one electrolyte, wherein a molar ratio of the electroactive metal to the alkali metal halide in the positive electrode composition is greater than about 1.5; and
  (c) a positive current collector disposed in the first compartment, such that a portion of the positive current collector extends into the positive electrode composition,
  wherein the first compartment is characterized by a primary dimension and the extended portion of the positive current collector is characterized by a primary dimension, and the primary dimension of the extended portion of the positive current collector is less than about 20% of the primary dimension of the first compartment.

Another embodiment of the invention is directed to a method for the preparation of an electrochemical cell, comprising:
  (i) providing a housing having an interior surface defining a volume;
  (ii) disposing an elongated ion-conducting separator inside the housing, wherein the separator has a first surface that defines at least a portion of a first compartment, and a second surface that defines a second compartment;
  (iii) disposing a positive electrode composition in the first compartment, wherein the positive electrode composition comprises at least one electroactive metal, at least one alkali metal halide, and at least one electrolyte; and
  (iv) disposing a positive current collector in the first compartment, such that a portion of the positive current collector extends into the positive electrode composition,
  wherein the first compartment is characterized by a primary dimension and the extended portion of the positive current collector is characterized by a primary dimension, and the primary dimension of the extended portion of the positive current collector is less than about 20% of the primary dimension of the first compartment.

DRAWINGS

DETAILED DESCRIPTION

This invention relates generally to electrochemical cells. In some specific embodiments, the invention relates to a high-temperature, rechargeable electrochemical cell, and related devices.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In some embodiments, an electrochemical cell is presented. The electrochemical cell includes (a) an elongated ion-conducting separator having a first surface that defines at least a portion of a first compartment, and a second surface that defines at least a portion of a second compartment; (b) a positive electrode composition disposed in the first compartment, the positive electrode composition comprising at least one electroactive metal, at least one alkali metal halide, and at least one electrolyte; and (c) a positive current collector disposed in the first compartment such that a portion of the positive current collector extends into the positive electrode composition. The first compartment is characterized by a primary dimension and the extended portion of the positive current collector is characterized by a primary dimension, and the primary dimension of the extended portion of the positive current collector is less than about 20% of the primary dimension of the first compartment.

Figure 1:
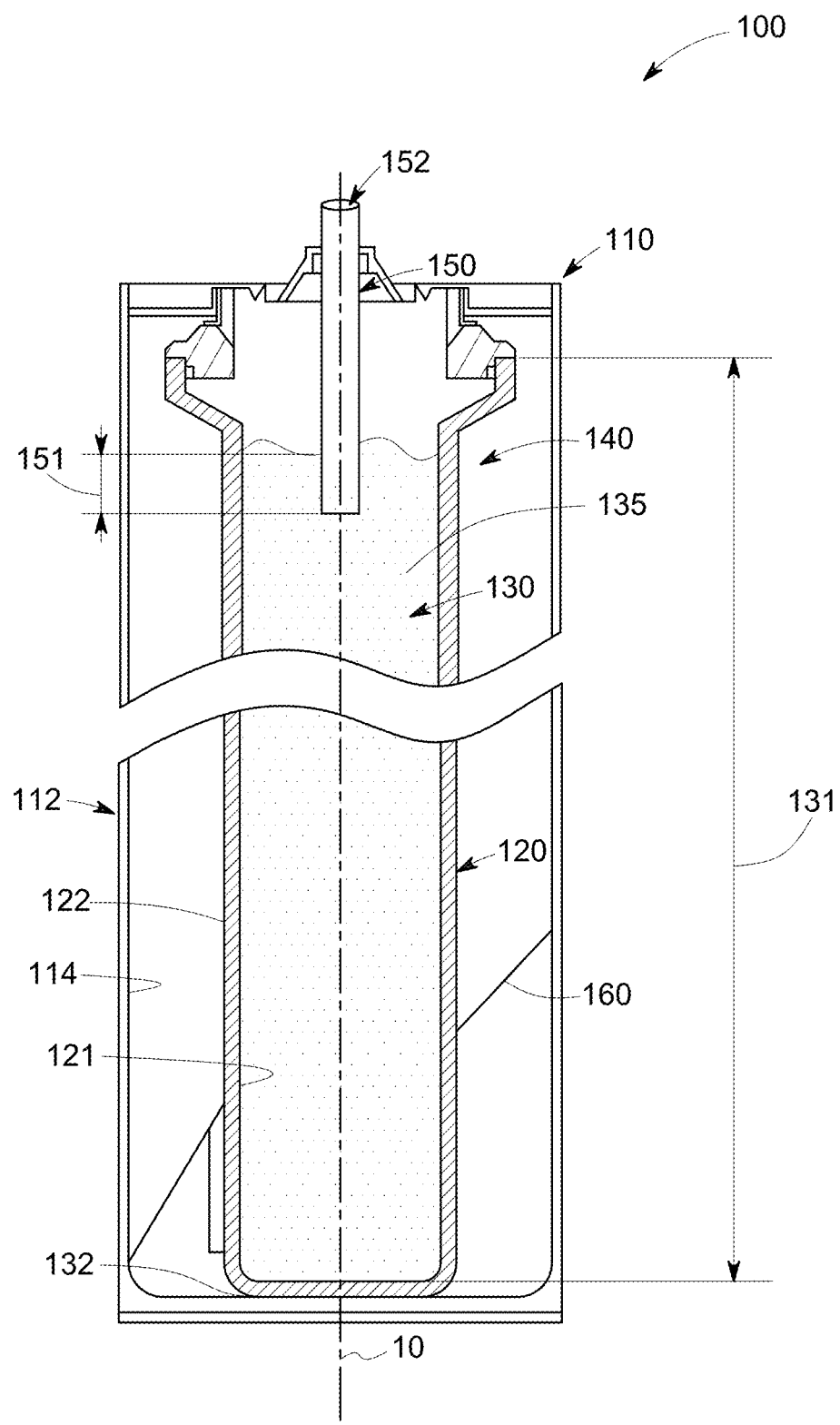
FIG. 1 is a schematic, cross-sectional view of a portion of an electrochemical cell, in accordance with some embodiments of the invention.

Referring now to FIG. 1, an electrochemical cell 100 is presented. More particularly, a front cross-sectional view 110 of the cell is depicted. In some embodiments, the electrochemical cell 100 includes a housing 112. The housing 112 has an interior surface 114, defining a volume. An elongated ion-conducting separator 120 is further disposed inside the housing 112. The separator 120 has a first surface 121 that defines at least a portion of a first compartment 130 (for example, a positive electrode compartment). The separator has a second surface 122 that defines a portion of a second compartment 140 (for example, an anode compartment). The term "ion-conducting" as used herein means that the separator 120 is capable of conducting ions between the first compartment 130 and the second compartment 140. The term "elongated" as used herein means that a length to width ratio of the separator, along a vertical axis 10, is greater than about 2. In one embodiment, the separator may have a length to width ratio that is greater than about 10, along a vertical axis 10. In one embodiment, the length to width ratio of the separator is in a range of from about 5 to about 10, although other relative dimensions are possible, as described in U.S. application Ser. No. 13/034,184.

Figure 2:
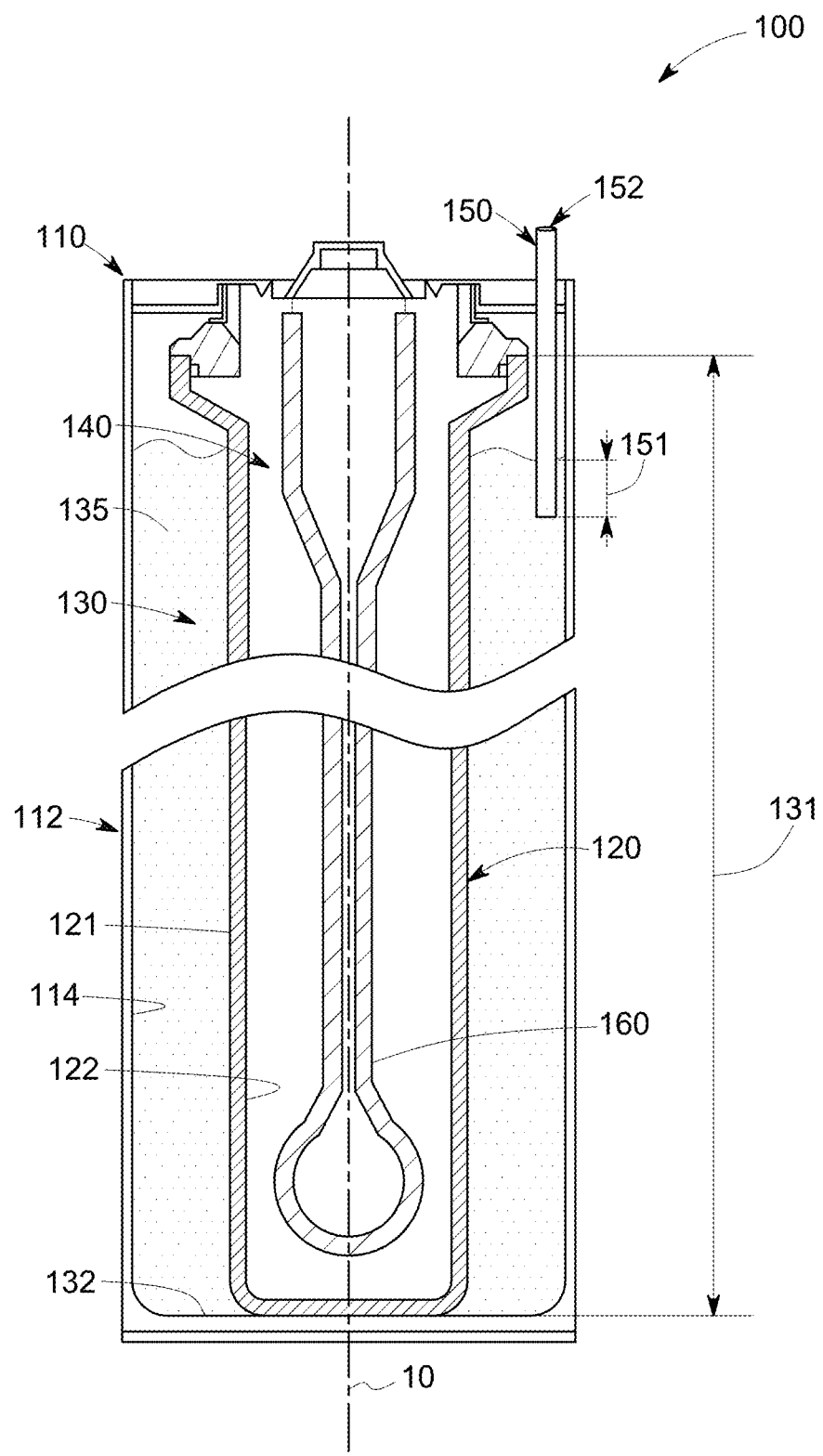
FIG. 2 is a schematic, cross-sectional view of a portion of an electrochemical cell, in accordance with some embodiments of the invention.

FIG. 1 depicts embodiments wherein the first compartment 130 is disposed within the second compartment 140. In such instances, the positive electrode compartment 130 is disposed within the anode compartment 140. In some other embodiments, the second compartment 140 is disposed within the first compartment 130, as indicated in FIG. 2. In such instances, the anode compartment 140 is disposed within the positive electrode compartment 130. The terms "first compartment" and the "positive electrode compartment" are used herein interchangeably. Further, the terms "second compartment" and the "anode compartment" are used herein interchangeably. The first compartment 130 is in ionic communication with the second compartment 140 through the separator 120. As used herein, the phrase "ionic communication" refers to the traversal of alkali metal ions between the first compartment 130 and the second compartment 140, through the separator 120.

With continued reference to FIGS. 1 and 2, in some embodiments, the housing 112 of the electrochemical cell may be sized and shaped to have a cross-sectional profile that is square, polygonal, or circular, for example. The housing may be formed from a material including a metal, ceramic, a composite, or combinations thereof. In some embodiments, a suitable metal may include nickel, iron, molybdenum, or steel.

As noted above, a separator 120 (FIGS. 1 and 2) is disposed within the volume of the housing. In some embodiments, the separator may be sized and shaped to have a cross-sectional profile configured to provide a maximum surface area for alkali metal ion transport. In some embodiments, the separator may have a cross-sectional profile normal to a vertical axis 10 of the housing 112 (FIGS. 1 and 2). In some embodiments, the separator includes a shape with a cross-sectional profile that may be an ellipse, a triangle, a cross, a star, a circle, a cloverleaf, a rectangle, a square, a polygon, a multi-lobe, or combinations thereof.

In some embodiments, the separator is a solid separator. In some embodiments, the solid separator includes an alkali metal ion conductor solid electrolyte capable of transporting alkali metal ions between the first compartment and the second compartment. Suitable materials for the solid separator may include an alkali-metal-beta-alumina, alkali-metal-beta"-alumina, alkali-metal-beta'-gallate, or alkali-metal-beta"-gallate. In some embodiments, the solid separator may include a beta-alumina, a beta"-alumina, a gamma alumina, or a micromolecular sieve such as, for example, a tectosilicate, such as a feldspar, or a feldspathoid. Other exemplary separator materials include zeolites, for example a synthetic zeolite such as zeolite 3A, 4A, 13X, ZSM-5; rare-earth silicophosphates; silicon nitride; beta'-alumina; beta"-alumina;

gamma alumina; a micromolecular sieve; or a silicophosphate (NASICON: $Na_3Zr_2Si_2PO_{12}$).

In some embodiments, the separator may be stabilized by the addition of small amounts of a dopant. The dopant may include one or more oxides selected from lithia, magnesia, zinc oxide, and yttria. These stabilizers may be used alone or in combination with themselves, or with other materials.

In particular embodiments, the separator includes a beta alumina. In one embodiment, a portion of the separator is alpha alumina, and another portion of the separator is beta alumina. In some embodiments, the alpha alumina (a non-ionic-conductor) may help with sealing and/or fabrication of the energy storage device. In a particular embodiment, the separator includes a beta alumina separator electrolyte (BASE), and may include one or more dopants.

In some embodiments, at least one of the alkali metals in the positive electrode composition may be sodium, and the separator may be beta-alumina. In another embodiment, the alkali metal may be potassium or lithium, with the separator then being selected to be compatible therewith. For example, in embodiments where the ions include potassium, silver, strontium, and barium cations, the separator material may include beta alumina. In certain other embodiments, where lithium cations are used, lithiated borophosphate $BPO_4$—$Li_2O$, may be employed as the separator material.

In one embodiment, the separator may be a tubular container having at least one wall of a selected thickness; and a selected ionic conductivity. In some embodiments, the thickness of the separator wall may be less than about 5 millimeters. A cation facilitator material may be disposed on at least one surface of the separator, in one embodiment. The cation facilitator material may include, for example, selenium, as discussed in published U.S. Patent Application No. 2010/0086834, incorporated herein by reference.

Further, as noted earlier, a positive electrode composition (or cathodic material) 135 is disposed inside the first compartment (positive electrode compartment) 130. In some embodiments, the positive electrode composition 135 includes at least one electroactive metal, at least one alkali metal halide, and at least one electrolyte.

In some embodiments, the electroactive metal is selected from the group consisting of titanium, vanadium, niobium, molybdenum, nickel, cobalt, chromium, manganese, silver, antimony, cadmium, tin, lead, iron, zinc, and combinations thereof. In some specific embodiments, the electroactive metal includes nickel, iron, zinc, cobalt, chromium, or combinations thereof. In particular embodiments that are preferred for some end uses, the electroactive metal is nickel. In some embodiments, the positive electrode composition includes at least two electroactive metals. In some embodiments, the at least two electroactive metals include nickel and iron.

In some embodiments, the electroactive metal is substantially free of copper. The term "substantially free" as used herein means that the amount of copper in the positive electrode composition is less than about 1 weight percent. Without being bound by any theory, it is believed, that copper, if present in the positive electrode composition, may sometimes oxidize to form one or both of cuprous (+1) and cupric (+2) ions. These ions are soluble in the electrolyte, and may therefore be transported to the separator, leading to swelling and fracture of the separator. In some particular embodiments, the amount of copper in the positive electrode composition is less than about 0.01 weight percent.

As noted previously, the positive electrode composition further includes at least one alkali metal halide. In some embodiments, a suitable alkali metal halide includes at least one halide of sodium, potassium, or lithium. In some embodiments, a suitable alkali metal halide includes a chloride, bromide, or fluoride. In some embodiments, the positive electrode composition includes at least one sodium halide, e.g., sodium chloride. In some embodiments, the positive electrode composition includes at least two alkali metal halides. One such example includes sodium chloride and at least one of sodium iodide and sodium fluoride. In some embodiments, sodium iodide or sodium fluoride, when present, is at a level of about 0.1 weight percent to about 0.9 weight percent, based on the weight of the entire positive electrode composition. Some specific positive electrode compositions are described in copending application Ser. No. 13/034,184 (Bogdan Jr. et al); filed on 24 Feb. 2011, and incorporated herein by reference. In some embodiments, the electroactive metal and the alkali metal halide may be combined in the form of granules in the positive electrode composition.

In some embodiments, the electroactive metal is present in the positive electrode composition at a concentration greater than a stoichiometric amount relative to the alkali metal halide. For example a molar ratio of the electroactive metal to the alkali metal halide in the positive electrode composition is sometimes greater than about 1.5. In some embodiments, a molar ratio of the electroactive metal to the alkali metal halide in the positive electrode composition is greater than about 1.6. In particular embodiments, a molar ratio of the electroactive metal to the alkali metal halide in the positive electrode composition is in a range from about 1.8 to about 3. As noted, in some embodiments, the positive electrode composition may include a plurality of electroactive metals and/or a plurality of alkali metal halides. In such embodiments, the molar ratio of the electroactive metal to the alkali metal halide may be calculated using the cumulative molar content of the electroactive metals and/or the cumulative molar content of the alkali metal halides.

In some embodiments, a concentration of the electroactive metal in the positive electrode composition is greater than about 40 weight percent of the positive electrode composition. In some embodiments, a concentration of the electroactive metal in the positive electrode composition is greater than about 45 weight percent of the positive electrode composition. In some embodiments, a concentration of the electroactive metal in the positive electrode composition is in a range about 50 weight percent to about 60 weight percent of the positive electrode composition.

Without being bound by any theory, it is believed that at least a portion of the excess electroactive metal (relative to the alkali metal halide) in the positive electrode composition may provide for current collection in the axial direction, in addition to the current collection in the radial direction.

Referring again to FIGS. 1 and 2, in some embodiments, the first compartment 130 defines an axial direction 10 substantially perpendicular to a base 132 of the first compartment. In one embodiment, the composition of the positive electrode composition is substantially constant in the axial direction 10. The term "substantially constant" as used herein means that an amount of the electroactive metal in the positive electrode composition varies by less than about 5 percent in the axial direction. In some embodiments, the composition of the positive electrode composition is substantially constant in the axial direction during the discharged state, the charged state, or both the charged and discharged states of the electrochemical cell.

In another embodiment, the positive electrode composition is compositionally graded in the axial direction 10. The term "compositionally graded" as used herein means that an amount of the electroactive metal in the positive electrode composition varies in the axial direction. In a particular embodiment, the amount of the electroactive metal in the positive electrode composition may decrease in a direction away from the positive current collector 150 (described in detail later), and towards the base 132 of the first compartment 130. In some embodiments, the composition of the positive electrode composition is compositionally graded in the axial direction during the discharged state, the charged state, or both the charged and discharged states of the electrochemical cell.

Furthermore, in embodiments including a compositionally graded positive electrode composition, a lower electroactive metal concentration proximate to the base 132 of the first compartment 130 and a relatively higher electroactive metal concentration proximate to the current collector 150 may provide for current flow and collection in the axial direction.

In some embodiments, the positive electrode composition further includes an electrolyte. The positive electrode composition can also be infused with a molten electrolyte. In some embodiments, the molten electrolyte transports the ions from a separator to the positive electrode, and vice-versa. In one embodiment, the molten electrolyte includes a binary salt including an alkali metal halide and aluminum halide. In a specific embodiment, the molten electrolyte is sodium tetrachloroaluminate ($NaAlCl_4$). In some embodiments, the molten electrolyte may include one or more additional metal halides, and forms a ternary or quaternary electrolyte.

In addition to the components discussed above, the positive electrode composition may include a number of other constituents, in some embodiments. As an example, aluminum may be included in the positive electrode composition in a form other than its form in the electrolyte salt, and other than as an aluminum halide. In some embodiments, the aluminum may be in elemental form, e.g., aluminum metal flakes or particles. In some embodiments, the amount of elemental aluminum present in the positive electrode composition may be in a range from about 0.2 weight percent to about 1.5 weight percent, based on the weight of the positive electrode composition, not including the electrolyte.

In some embodiments, the positive electrode composition may further include sulfur, in the form of molecular sulfur or a sulfur-containing compound, such as a metal sulfide. Suitable examples of metals in the metal sulfide include alkali metals or transition metals. In one embodiment, the positive electrode composition includes a metal polysulfide. In one embodiment, the metal polysulfide includes iron disulfide, sodium disulfide, nickel disulfide, or combinations thereof. If present, the level of sulfur may be in a range from about 0.1 weight percent to about 5 weight percent, based on the total weight of the positive electrode composition. However, as described in application Ser. No. 13/034,184, in some embodiments, the positive electrode composition may be substantially free of sulfur, i.e., containing, at most, impurity levels.

In some embodiments, the positive electrode composition may also include other additives that beneficially affect the performance of an electrochemical cell. Such performance additives may increase ionic conductivity, increase or decrease solubility of the charged cathodic species, improve wetting of a solid electrolyte, i.e., the separator, by the molten electrolyte; or prevent ripening of the positive electrode micro-domains. In some embodiments, the performance additive may be present in an amount that is less than about 1 weight percent, based on the total weight of the positive electrode composition. Examples of such additives include one or two additional metal halides, e.g., sodium fluoride or sodium bromide.

In one embodiment, the positive electrode composition 135 is disposed on an electronically conductive support structure. The support structure may not undergo any chemical reaction during the charge/discharge, and may simply support the cathodic material during chemical reactions. The support structure may be in a number of forms, such as a foam, a mesh, a weave, a felt, or a plurality of packed particles, fibers, or whiskers. In one embodiment, a suitable support structure may be formed from carbon or a metal.

With continued reference to FIGS. 1 and 2, the electrochemical cell 100 further includes a positive current collector 150. The positive current collector 150 is disposed in the electrochemical cell 100 such that at least a portion of the positive current collector 150 extends into the positive electrode composition. Further, as indicated in FIGS. 1 and 2, the positive current collector 150 is in electrical communication with the positive electrode composition 135. The term "electrical communication" as used herein means that the positive current collector 150 is capable of conducting electrical current from the positive electrode composition 135 to the cell's external positive terminal.

As further indicated in FIGS. 1 and 2, the first compartment 130 is characterized by a primary dimension 131. Further, the portion of the positive current collector 150 extending into the positive electrode composition is characterized by a primary dimension 151, and the primary dimension 151 of the extended portion of the positive current collector 150 is less than about 20% of the primary dimension 131 of the first compartment 130. In some embodiments, as noted earlier, the first compartment has a substantially tubular geometry having an aspect ratio greater than about 1. In such embodiments, the term "primary dimension of the first compartment" refers to the height of the first compartment. Similarly, in some embodiments, the term "primary dimension of the extended portion of the positive current collector" refers to the length of the extended portion of the current collector. In some embodiments, the length 151 of the extended portion of the current collector is less than about 20% of the height 131 of the first compartment 130. In some embodiments, the primary dimension 151 of the extended portion of the positive current collector 150 is less than about 10% of the primary dimension 131 of the first compartment 130. Without being bound by any theory, it is believed that the positive current collector configurations, in accordance with some embodiments of the invention, may provide for cost-effective electrochemical cells while maintaining the desired performance attributes.

The positive electrode composition may be further characterized by an axial depth, that is, depth in the axial direction 10. In some embodiments, the positive current collector 150 extends into less than about 20 percent of the axial depth of the positive electrode composition 135. In some embodiments, the positive current collector 150 extends into less than about 15 percent of the axial depth of the positive electrode composition 135.

In some embodiments, the positive current collector comprises a shape selected from the group consisting of a hollow tube, a wire, a brush, a plate, and combinations thereof. In one embodiment, the positive current collector is in the shape of a hollow tube 150, as indicated in FIG. 1. As further, indicated in FIG. 1, in some embodiments, at least a portion of the hollow tube 150 extends into a portion of the positive electrode composition 135. In some embodiments, at least a portion of the positive electrode composition may be introduced into the first compartment 130 through the opening 152 of the hollow tube 150.

Figure 3:
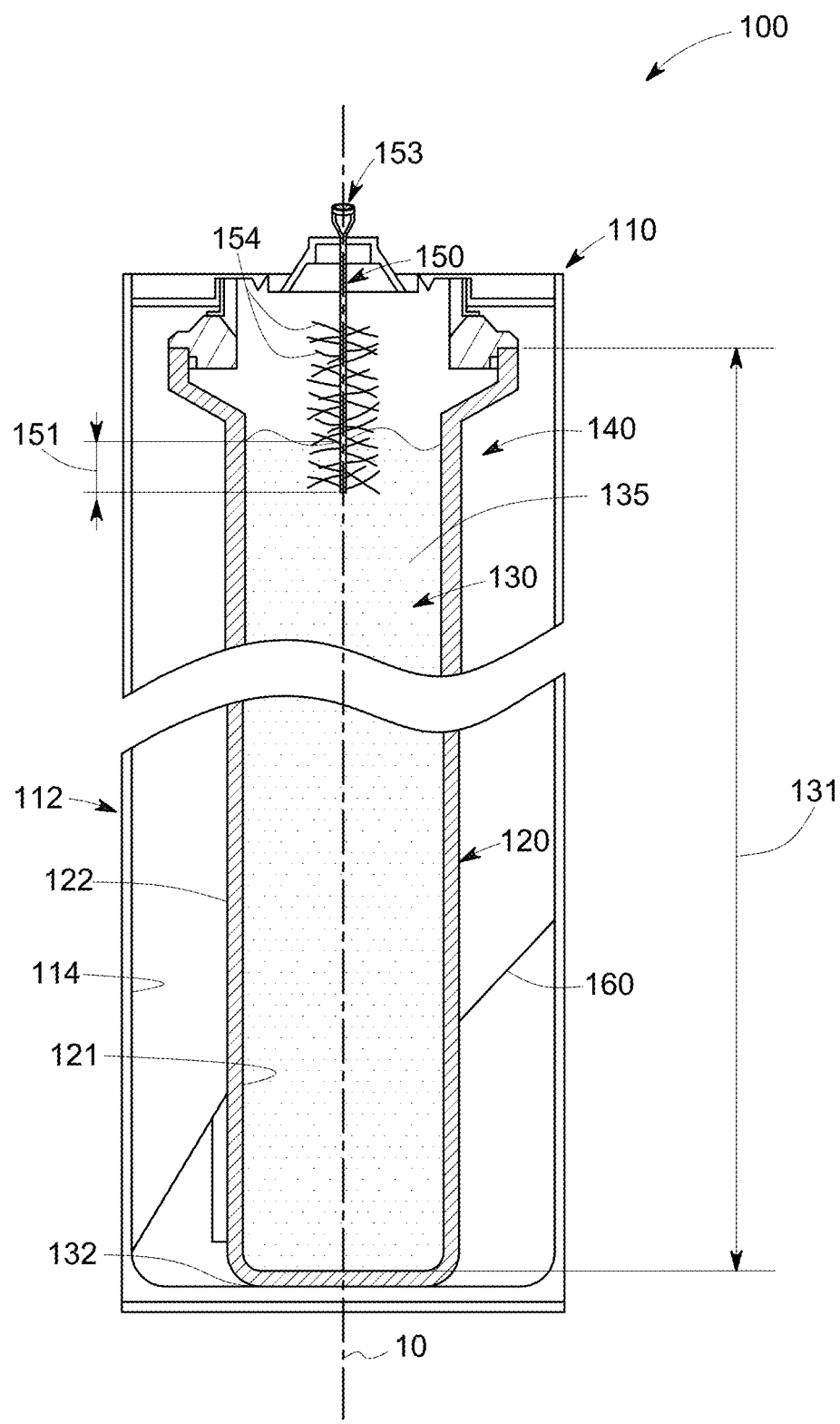
FIG. 3 is a schematic, cross-sectional view of a portion of an electrochemical cell, in accordance with some embodiments of the invention.
Figure 4:
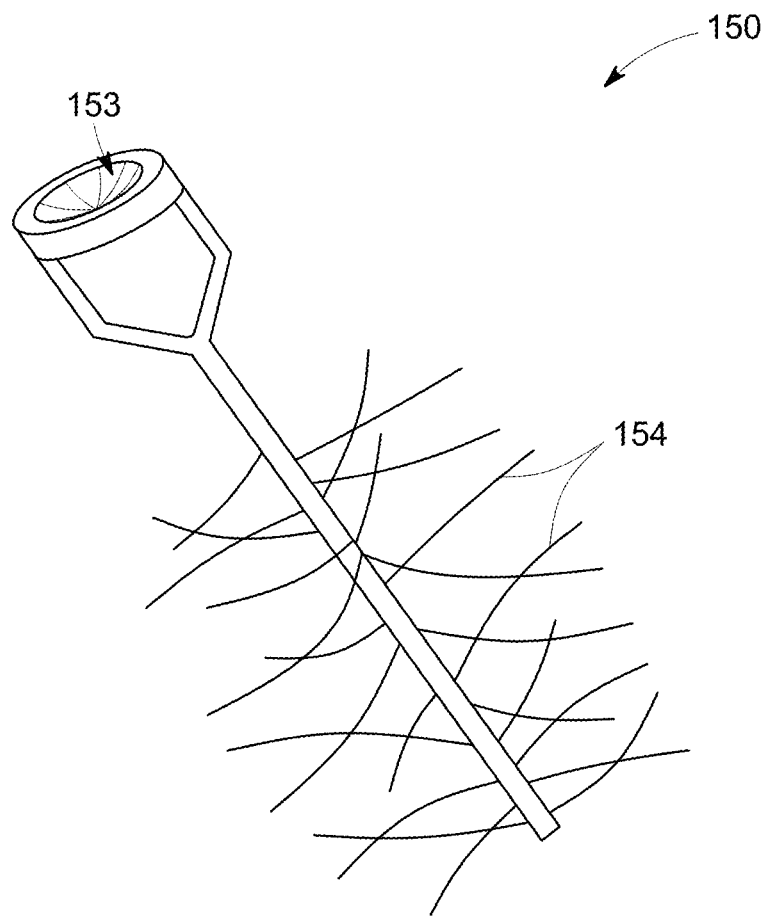
FIG. 4 is a schematic representation of a brush-type current collector, in accordance with some embodiments of the invention.

As mentioned above, the positive current collector can be in the shape of a brush, as indicated in FIGS. 3 and 4. As further indicated in FIG. 3, in some embodiments, at least a portion of the brush 150 extends into a portion of the positive electrode composition 135. In some embodiments, at least a portion of the positive electrode composition may be introduced into the first compartment through the opening 153 of the brush 150. As further indicated in FIGS. 3 and 4, the brush 150 often includes a plurality of bristles 154. The plurality of bristles 154 may provide a larger surface area of contact with the positive electrode composition 135.

Suitable materials for the positive current collector include platinum, palladium, gold, nickel, copper, carbon, titanium, and combinations thereof. The positive current collector may be plated or clad in some embodiments. In some other embodiments, the positive current collector includes a solid metal current collector. In one embodiment, the current collector is substantially free of iron. In one embodiment, the current collector is substantially free of copper. In a particular embodiment, the positive current collector includes nickel.

Without being bound by any theory, it is believed, that iron or copper, if present in the positive electrode composition, may oxidize to form ions. These ions are soluble in the electrolyte, and may therefore be transported to the separator, leading to swelling and fracture of the separator, as noted previously.

As described earlier, the electrochemical cell 100 (FIGS. 1-3) further includes a second compartment (or anode compartment) 140 comprising an anodic material (not shown). Typically, the anode compartment 140 is empty in the ground state (uncharged state) of the electrochemical cell. The anode compartment 140 is then filled with metal from reduced metal ions that move from the positive electrode compartment 130 to the anode compartment 140 through the separator 120, during operation of the cell. The anode compartment 140 may receive and store a reservoir of the anodic material, in some embodiments. Typically, the anodic material includes an alkali metal. Non-limiting examples of the anodic material may include lithium, sodium, or potassium. The anodic material is usually molten during use. In one embodiment, the anodic material includes sodium.

In some embodiments, the anodic material may include one or more additives. Additives suitable for use in the anodic material may include a metallic oxygen scavenger. Suitable metal oxygen scavengers may include one or more of manganese, vanadium, zirconium, aluminum, or titanium. Other useful additives may include materials that increase wetting of the separator surface defining the anode compartment, by the molten anodic material. Additionally, some additives or coatings may enhance the contact or wetting between the separator and the current collector, to ensure substantially uniform current flow throughout the separator.

As indicated in FIGS. 1 and 2, the electrochemical cell 100 may also include a negative electrode current collector (also referred to as the anode current collector) 160 disposed in the second compartment 140. In some embodiments, the negative electrode current collector may function as a shim, as well. The anode current collector is in electrical communication with the anode compartment. Suitable materials for the anode current collector include iron, steel, aluminum, tungsten, titanium, nickel, copper, molybdenum, carbon, and combinations thereof.

In some embodiments, one or more shim structures may be disposed within the volume of the housing. In some embodiments, the shim structures may support the separator within the volume of the housing. The shim structures may protect the separator from vibrations caused by the motion of the cell during use, and thus reduce or eliminate movement of the separator relative to the housing. In one embodiment, a shim structure may also function as a current collector, as described herein.

Another embodiment of the invention is directed an electrochemical cell including (a) an elongated ion-conducting separator having a first surface that defines at least a portion of a first compartment and a second surface that defines at least a portion of a second compartment; (b) a positive electrode composition disposed in the first compartment, the positive electrode composition comprising at least one electroactive metal, at least one alkali metal halide, and at least one electrolyte, wherein a molar ratio of the electroactive metal to the alkali metal halide in the positive electrode composition is greater than about 1.5; and (c) a positive current collector disposed in the first compartment such that the positive current collector is in electrical communication with the positive electrode composition; wherein the first compartment is characterized by a height dimension and the positive current collector is characterized by a length dimension, and the length dimension of the positive current collector is less than about 20% of the height dimension of the first compartment.

In some embodiments, the electrochemical cells illustrated herein may be rechargeable over a plurality of charge-discharge cycles. In general, the electrochemical cell may be employed in a variety of applications; and the plurality of cycles for recharge may be dependent on factors such as charge and discharge current, depth of discharge, cell voltage limits, and the like.

In one embodiment, the electrochemical cell may be employed in an uninterruptable power supply (UPS) device. In one embodiment, the electrochemical cell may be employed in an energy storage device.

Another embodiment of the invention is directed to an energy storage battery. In some embodiments, a plurality of the electrochemical cells (each of which may be considered a rechargeable electrochemical cell), as described herein, may be organized into an energy storage system, for example, a battery. Multiple cells may be connected in series or parallel, or in a combination of series and parallel. For convenience, a group of coupled cells may be referred to as a module or pack. The ratings for the power and energy of the module may depend on such factors as the number of cells, and the connection topology in the module. Other factors may be based on end-use application specific criteria.

Another embodiment of this invention is directed to a method for the preparation of an electrochemical cell, as mentioned previously. In some embodiments, the method includes providing a housing having an interior surface defining a volume; disposing an elongated ion-conducting separator inside the housing, wherein the separator has a first surface that defines at least a portion of a first compartment, and a second surface that defines at least a portion of a second compartment. The first compartment is in ionic communication with the second compartment through the separator. The method further includes disposing a positive electrode composition in the first compartment, such that the positive current collector is in electrical communication with the positive electrode composition. The first compartment is characterized by a primary dimension, and the positive current collector is characterized by a primary dimension, and the primary dimension of the positive current collector is less than about 20% of the primary dimension of the first compartment.

EXAMPLES

The examples presented below are intended to be merely illustrative, and should not be construed to be any sort of limitation on the scope of the claimed invention. Unless specified otherwise, all of the components are commercially available from common chemical suppliers.

Comparative Example 1

Electrochemical Cell with a Conventional Current Collector

A sodium chloride/nickel based energy storage cell was assembled, using the composition provided in Table 1.

TABLE 1

Composition details of electrochemical cells.

| Composition Wt % | NaCl | Ni255 | Fe | Al | NaF | NaI | FeS | Electrolyte |
|---|---|---|---|---|---|---|---|---|
| Comparative Example 1 | 98.7 | 163.9 | 13.8 | 1.3 | 3.8 | 1.0 | 4.1 | 123.5 |
| Example 1 | 104.4 | 191.9 | 14.8 | 1.4 | 4.0 | 1.1 | 4.4 | 118 |

The sodium chloride (NaCl) was obtained from a commercial source, already milled and vacuum-dried, and having an average particle size of less than about 95 micrometers. The material was re-dried in an oven at 240° C., before use. Positive electrode materials, including metal nickel powder, sodium chloride, sodium fluoride, sodium iodide, iron, and aluminum powder, were pressed at ambient room temperature (typically about 18° C.-25° C.), under a linear pressure of about 16-25 kN/cm, using an Alexanderwerk WP50N/75 Roll Compactor/Milling Machine. The resulting agglomerate was ground with a classifier mill into granules; and the fraction containing a particle size of about 0.325 to about 1.5 millimeters was used for the cell assembly. In continuing with the preparation of the energy storage system, the electrolyte, sodium tetrachloroaluminate (NaAlCl$_4$) was obtained from Sigma Aldrich and added to the cathode material.

An electrochemical cell similar to that of FIG. 1 was assembled; and reference to the figure (cell 100) will be made here, to aid in this description. The separator tubes 120 for the cell 100, cloverleaf in shape, were produced according to known methods; or were commercially obtained. Each tube 120 was formed from ceramic sodium conductive beta"-alumina (β"-alumina tube). The cylinder dimensions were 228 millimeters length (210 mm of useful length), 39.1 millimeters, internal span, and 41.8 millimeters, outside span. These are dimensions from lobe tip to lobe tip. Each ceramic separator tube was glass sealed to an alpha alumina collar, to form an assembly. Each assembly was placed in a stainless steel housing 112 that served as the housing to form an electrochemical cell. The steel case size, square in cross section, was about 36 millimeters×36 millimeters×240 millimeters×0.4 millimeters thick.

The β"-alumina tube was pre-assembled with a case, forming the anode chamber, and a cathode chamber current collector. In the case of comparative example 1, the cathode included a nickel (Ni) current collector in the form of a U-shaped rod, which extended down the center of the separator tube, from the top of the cell to within 50 mm of the closed-end bottom of the separator tube. All cells were assembled in the discharged state. The anode chamber contained no sodium at the time of assembly. The compacted cathode granules, which contained all of the components in Table 1, except the electrolyte, were poured into the separator tube through the opening at the top, and the granule bed was densified by vibration on a vibratory shaker in a nitrogen filled glove box. The combined weight of nickel (present in the positive electrode composition and in the positive current collector) was about 198 g/cell.

The molten sodium tetrachloroaluminate NaAlCl$_4$ electrolyte was injected under vacuum at 280° C. into the granule bed in the β"-alumina tube. Following this, vacuum was released, and the fill cap was welded onto the top of the cell, which was held at a temperature of about 230° C., using a commercial tungsten inert gas welding system, with an argon purge, in order to seal the cathode from the environment. The above steps, including granule filling, electrolyte filling and sealing, were done in an argon-purged glove box. The resulting electrochemical cell was then subjected to charging/discharging cycle testing as described below.

Example 1

Electrochemical Cell with a Modified Current Collector

Electrochemical cells were fabricated using the method described above in Comparative Example 1, except the nickel positive chamber current collector had a reduced length of about 35 millimeters, such that about 10 millimeters of the current collector extended into the cathode granule bed composition. Further, the amount of nickel in the positive electrode composition was greater than the amount of nickel added to the positive electrode composition in the Comparative Example 1 (Table 1). The combined weight of nickel (present in the positive electrode composition and the in electrode current collector) was about 201 g/cell.

Example 2

Testing of Cells

Cell testing was carried out, according to a standard protocol described in the referenced application Ser. No. 13/034, 184, using a 100 A, 10V, multi-channel Digatron BTS600 battery testing system. The testing protocol involved a series of charging and discharging cycles, with a corresponding regimen of current, voltage, and temperature adjustments (approximately 225 cycles in all). For each cell described above in Comparative Example 1 and Example 1, the discharge capacity was measured, in terms of a "maiden discharge capacity check", which was initiated at low current, to avoid excessive current densities during the initial production of sodium in the negative electrode. This capacity check was also conducted approximately once per week during the testing process to determine if the discharge capacity was lost during repetitive cycling. After the maiden discharge capacity check, the cell was cycled by repetitively charging at 20 A to 2.67V with a 0.5 A trip, followed by 13 W discharges for 4 hours.

Figure 5:
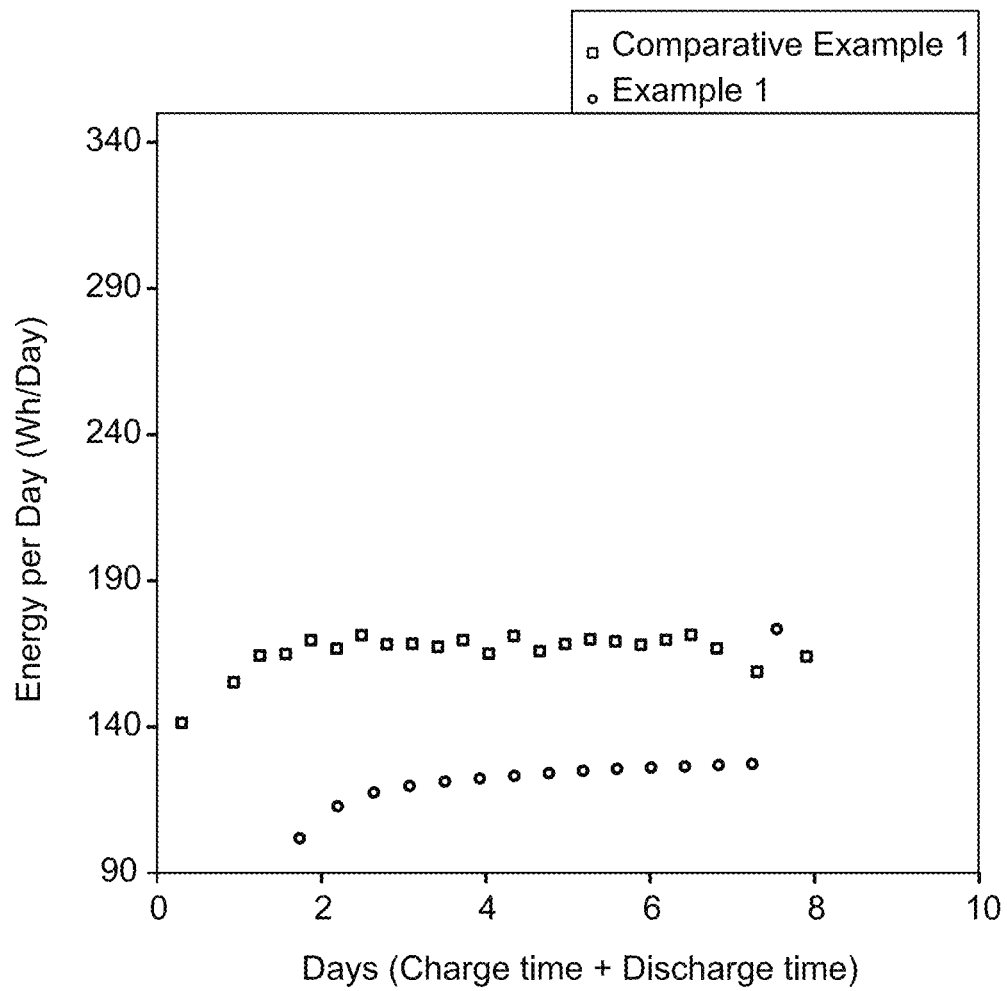
FIG. 5 is a plot of energy per day as a function of charging and discharging days for electrochemical cells using conventional and modified current collectors.
Figure 6:
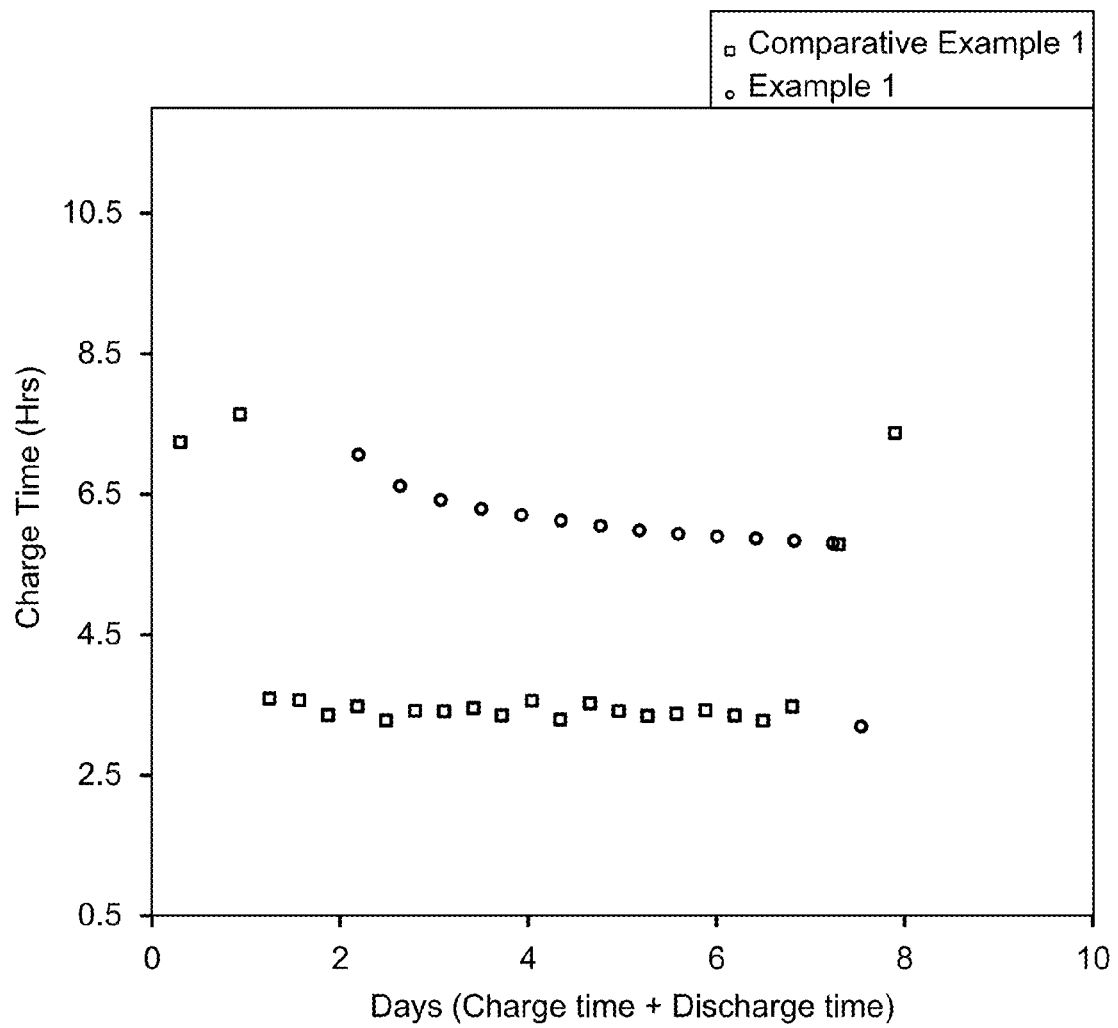
FIG. 6 is a plot of charge time as a function of charging and discharging days for electrochemical cells using conventional and modified current collectors.
Figure 7:
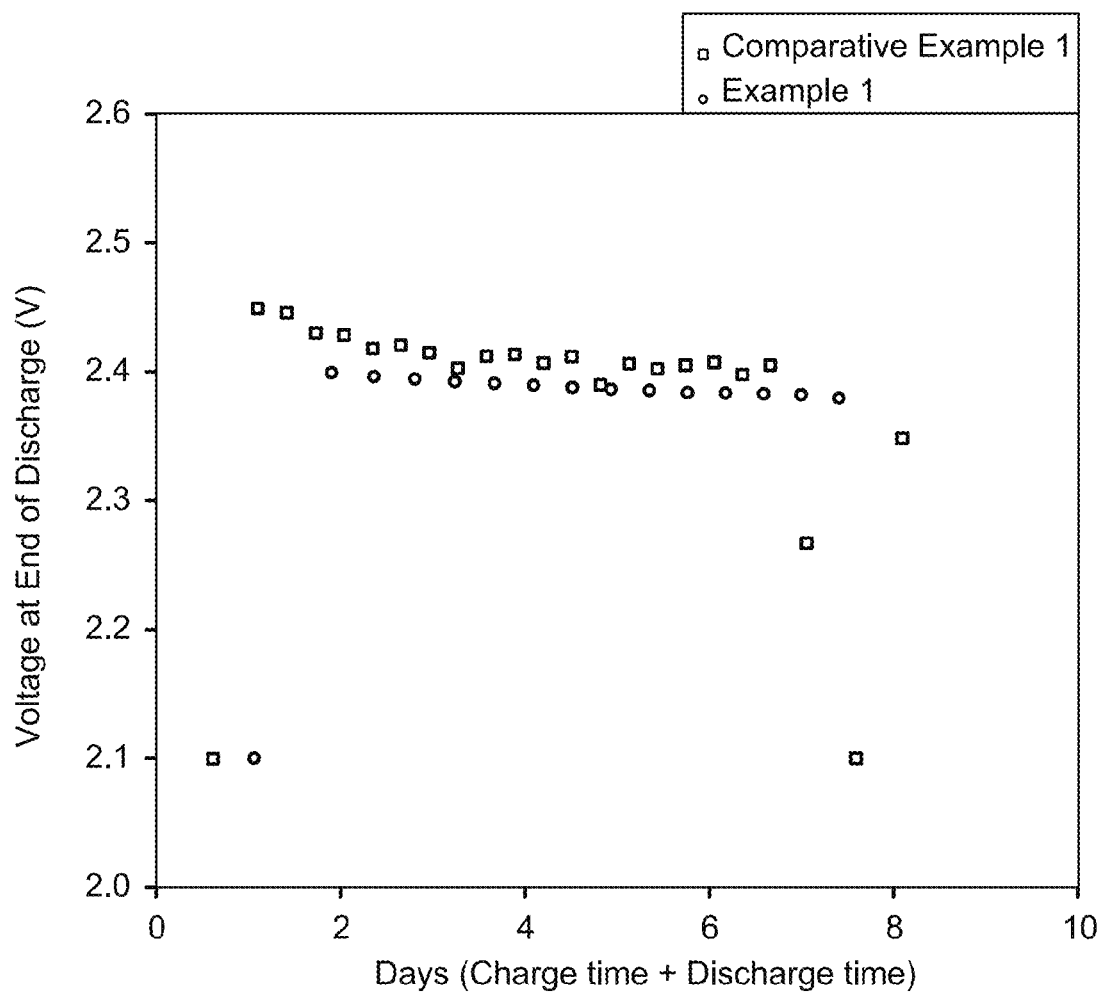
FIG. 7 is a plot of end of discharge voltage as a function of charging and discharging days for electrochemical cells using conventional and modified current collectors.

FIG. 5 is a graph representing energy per day as a function of total charging and discharging duration. Energy/day is defined as 38 W-h divided by total discharge+charge time in days. FIG. 6 is a graph representing charge time as a function of total charging and discharging duration. FIG. 7 is a graph representing voltage at the end of discharge as a function of total charging and discharging duration. Comparative Example 1 represents the cell that includes a conventional Ni current collector. Example 1 represents the cell that includes a modified current collector and an additional amount of nickel in the positive electrode composition. FIGS. 5-7 illustrate that the net addition of 3 grams (201 grams versus 198 grams) of nickel may be insufficient, and a larger addition of nickel powder may be required to provide equivalent performance between the cell of Example 1 versus the cell of Comparative Example 1.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. An electrochemical cell, comprising:
   (a) an elongated ion-conducting separator having a first surface that defines at least a portion of a first compartment and a second surface that defines at least a portion of a second compartment;
   (b) a positive electrode composition disposed in the first compartment, the positive electrode composition comprising at least one electroactive metal, at least one alkali metal halide, and at least one electrolyte; and
   (c) a positive current collector disposed in the first compartment such that an extended portion of the positive current collector extends into the positive electrode composition,
   wherein the first compartment is characterized by a primary dimension and the extended portion of the positive current collector is characterized by a primary dimension, and the primary dimension of the extended portion of the positive current collector is less than about 20% of the primary dimension of the first compartment.

2. The electrochemical cell of claim 1, wherein a molar ratio of the electroactive metal to the alkali metal halide in the positive electrode composition is greater than about 1.5.

3. The electrochemical cell of claim 1, wherein a molar ratio of the electroactive metal to the alkali metal halide in the positive electrode composition is in a range from about 1.8 to about 3.

4. The electrochemical cell of claim 1, wherein a concentration of the electroactive metal in the positive electrode composition is greater than about 40 weight percent of the positive electrode composition.

5. The electrochemical cell of claim 1, wherein the positive electrode composition is characterized by an axial depth, and the positive current collector extends into less than about 20 percent of the axial depth of the positive electrode composition.

6. The electrochemical cell of claim 1, wherein the positive current collector comprises a shape selected from the group consisting of a hollow tube, a wire, a brush, a plate, and combinations thereof.

7. The electrochemical cell of claim 1, wherein the positive current collector comprises a hollow tube extending into a portion of the positive electrode composition.

8. The electrochemical cell of claim 1, wherein the first compartment defines an axial direction substantially perpendicular to a base of the first compartment, and the positive electrode composition is compositionally graded in the axial direction.

9. The electrochemical cell of claim 8, wherein an amount of the electroactive metal in the positive electrode composition decreases in a direction away from the positive current collector and toward the base of the first compartment.

10. The electrochemical cell of claim 1, wherein the electroactive metal is selected from the group consisting of titanium, vanadium, niobium, molybdenum, nickel, cobalt, chromium, manganese, silver, antimony, cadmium, tin, lead, iron, zinc, and combinations thereof.

11. The electrochemical cell of claim 1, wherein the electroactive metal comprises nickel.

12. The electrochemical cell of claim 1, wherein the electroactive metal is substantially free of copper.

13. The electrochemical cell of claim 1, wherein the positive electrode composition comprises a plurality of electroactive metals.

14. The electrochemical cell of claim 1, wherein the alkali metal halide comprises at least one halide of sodium, potassium, or lithium.

15. The electrochemical cell of claim 1, wherein the positive electrode composition comprises a plurality of alkali metal halides.

16. The electrochemical cell of claim 1, wherein the second compartment is disposed within the first compartment.

17. The electrochemical cell of claim 1, wherein the first compartment is disposed within the second compartment.

18. An energy storage battery comprising a plurality of rechargeable electrochemical cells in accordance with claim 1.

19. An electrochemical cell, comprising:
   (a) an elongated ion-conducting separator having a first surface that defines at least a portion of a first compartment and a second surface that defines at least a portion of a second compartment;
   (b) a positive electrode composition disposed in the first compartment, the positive electrode composition comprising at least one electroactive metal, at least one alkali metal halide, and at least one electrolyte, wherein a molar ratio of the electroactive metal to the alkali metal halide in the positive electrode composition is greater than about 1.5; and
   (c) a positive current collector disposed in the first compartment, such that an extended portion of the positive current collector extends into the positive electrode composition;
   wherein the first compartment is characterized by a height dimension, and the extended portion of the positive current collector is characterized by a length dimension, and the length dimension of the extended portion of the positive current collector is less than about 20% of the height dimension of the first compartment.

20. A method for the preparation of an electrochemical cell, comprising:
   (i) providing a housing having an interior surface defining a volume;
   (ii) disposing an elongated ion-conducting separator inside the housing, wherein the separator has a first surface that defines at least a portion of a first compartment, and a second surface that defines a second compartment;
   (iii) disposing a positive electrode composition in the first compartment, wherein the positive electrode composition comprises at least one electroactive metal, at least one alkali metal halide, and at least one electrolyte; and
   (iv) disposing a positive current collector in the first compartment such that an extended portion of the positive current collector extends into the positive electrode composition;
   wherein the first compartment is characterized by a primary dimension, and the extended portion of the positive current collector is characterized by a primary dimension, and the primary dimension of the extended portion of the positive current collector is less than about 20% of the primary dimension of the first compartment.

* * * * *